Feb. 7, 1950     H. R. WATSON     2,496,760
GRADING APPARATUS
Filed April 16, 1946     3 Sheets—Sheet 3
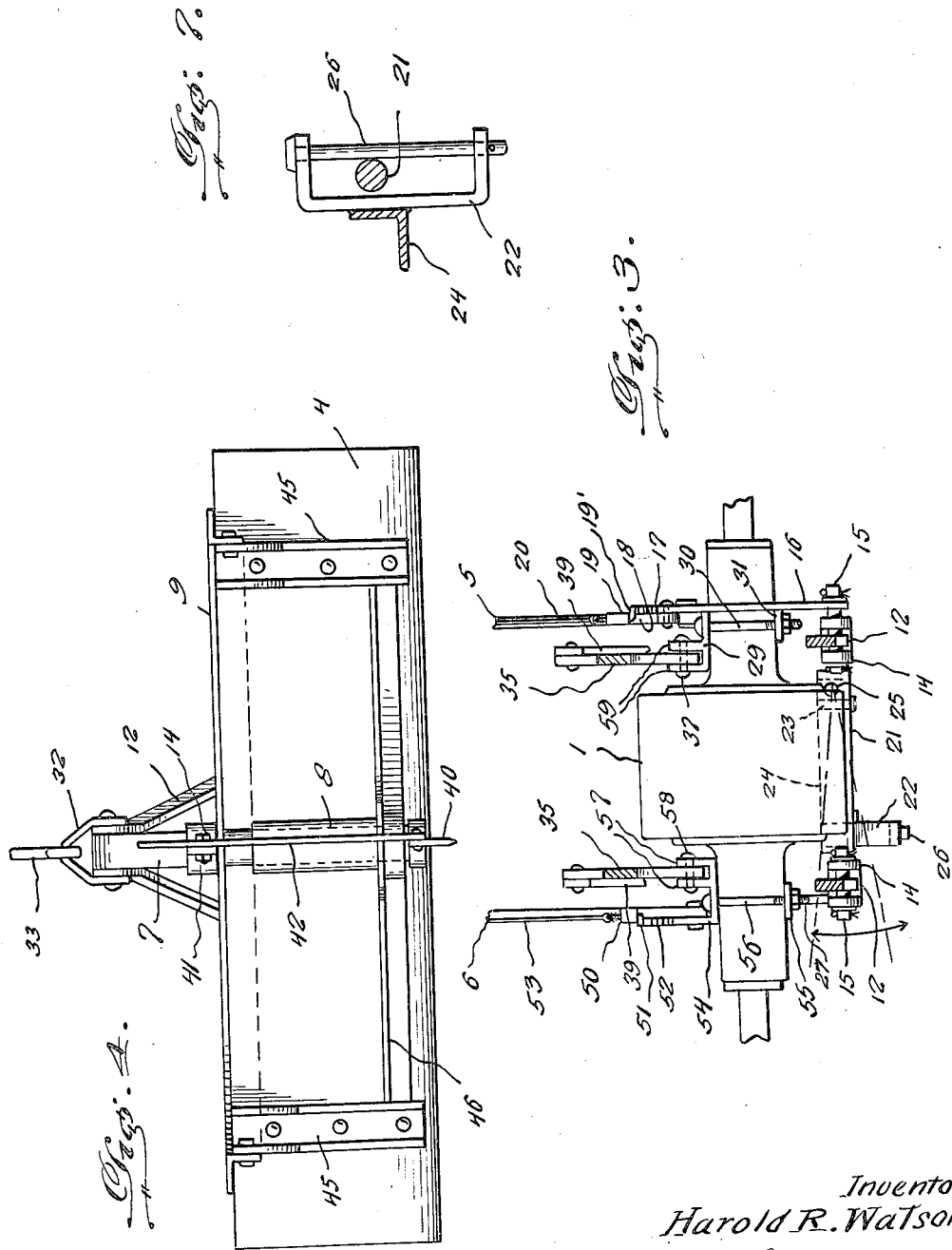
Inventor
Harold R. Watson,
By Morrow, Berman and Davidson
Attorneys Patented Feb. 7, 1950

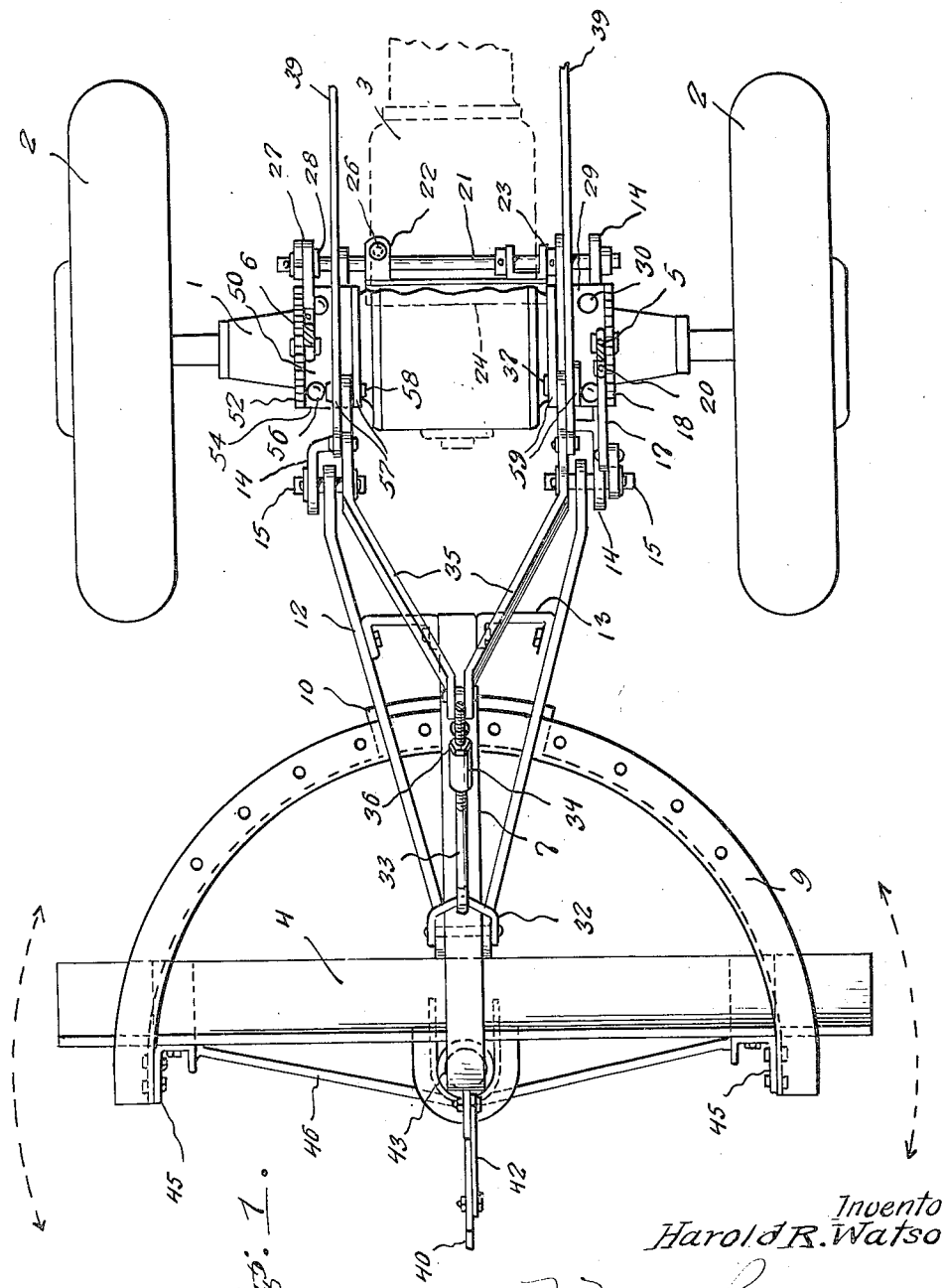

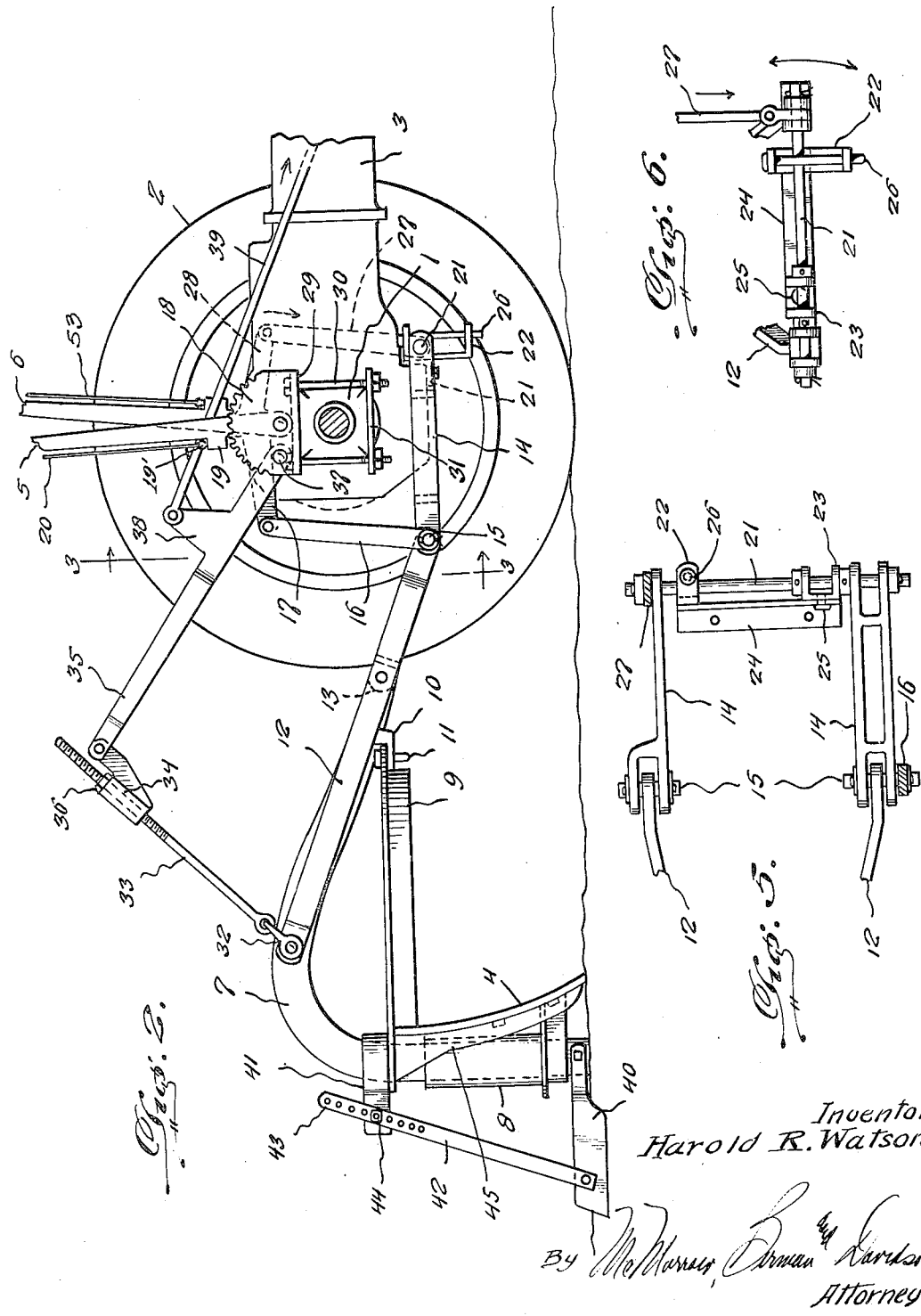

2,496,760

UNITED STATES PATENT OFFICE 2,496,760

GRADING APPARATUS

Harold R. Watson, Victorville, Calif.

Application April 16, 1946, Serial No. 662,468

2 Claims. (Cl. 37—159)

This invention relates to a grading apparatus and more particularly to a scraper adapted to be coupled to and operated by a power-driven tractor of the type which pulls a plow.

An object of the invention is to provide grading apparatus for moving dirt, leveling land and fine grading where dirt and soil are to be spread evenly to permit uniform irrigation with water; and for excavating ditches, grading roads and other uses.

Another object is to provide a grading apparatus wherein the scraper may be readily adjusted in various ways to suit different conditions of operation, and always work efficiently without unduly great stresses on any of its parts.

The nature of the invention is disclosed in the accompanying drawings and in the following specification; but it is to be understood that I set forth herein only the preferred embodiment of my invention, and that various changes may be made without departing from the principles thereof.

In the drawings:

Figure 1 is a top plan of a scraper according to this invention coupled to an ordinary farm tractor.

Figure 2 is a side view thereof.

Figure 3 is a transverse vertical section on the line 3—3 of Figure 2.

Figure 4 is a rear view of the scraper blade and associated blade supports.

Figure 5 is a top view of part of the adjustable frame which attaches the scraper to the tractor.

Figure 6 is a view of some of the parts of the frame shown in Figure 5 viewed from the right of the latter figure.

Figure 7 is an enlarged fragmentary view, partly in section, of the transversely disposed rod, yoke and pin assembly.

On the drawings the same numerals identify the same parts throughout.

The numeral 1 indicates the rear axle casing of the tractor, and 2 the drive wheels for same. From the casing 1 extends the housing 3 in which is the shaft and other parts for driving the tractor from the usual engine mounted thereon. The scraper blade 4 is attached to the tractor some distance to the rear of wheels 2, and its position is adjusted and controlled through a pair of levers 5 and 6 which extend upward over the axle casing 1 and can be manipulated from the seat of the driver on the tractor, which is not shown on the drawings. The blade 4 is supported by a longitudinally extending beam 7 connected to the tractor at its front end and having its rear end turned downward and provided as a cylindrical arbor received in a vertical bearing 8 at the middle of the scraper blade 4 and on the rear surface thereof. To the top of the blade 4 is secured an arcuate rack 9 which is slightly more than 180 degrees in extent, and is made rigid with the sides of the blade 4 at its two ends. This frame or rack 9 extends toward the tractor. It is preferably made of angle iron, with its top horizontal surface provided with a plurality of openings. By means of these openings the rack 9 can be connected to a bracket 10 by means of a pin 11. The bracket 10 is affixed to the under side of the beam 7, and the pin 11 can be made to engage with any one of the openings in the top of the rack 9. Thus, the blade 4 may be turned to a position such as to be in direct line with the tractor or to a position such as to be diagonal with respect to the tractor, the range of diagonal positioning being within the limits of the arcuate arrangement of the holes in the top of the rack 9. The structure thus described constitutes a means for turning the scraper blade to a straight or diagonal position with respect to the tractor.

To the beam 7 just forward of the blade 4 are attached a pair of rigid arms 12. These arms flank the beam 7 and diverge therefrom, and the forward end of the beam 7 is connected thereto by a pair of angle struts 13 shown in Figure 1 to make the beam 7 and the arms 12 substantially rigid throughout.

The ends of the arms 12 are pivotally connected to the tractor at the extremities of a pair of links 14 by means of pins 15, the links 14 being disposed beneath the axle casing 1 and connected at their forward ends to a transversely disposed rod 21. The rod 21, adjacent one of its ends, is engaged by the horizontal arms of a yoke-shaped member 22 which is rigidly secured to a transverse support member 24. Mounted on the rod 21 at a point adjacent its opposite end is a U-shaped bearing 23 which is pivotally attached to the transverse support bar 24 by means of a pin 25. The support member 24 may take the form of a piece of angle iron bar, and be affixed in any suitable manner to the bottom of the axle casing 1, a leg of which affords the surface to which the yoke 22 and bearing 23 may be attached. The rod 21, Figures 2 and 7, is held within the confines of the horizontal arms of the yoke member 22 by means of a pin 26, thereby permitting the rod 21 to be moved up and down and still be retained within such arms of the yoke member.

The end of rod 21 adjacent brackets 22, Figures 2 and 6, is pivotally connected to the lower end of a link 27 which is in turn connected to a lateral arm 28 carried by the base of the lever 6. The lever 6 is provided with a boss 50, Figure 3, which carries a dog 51 in engagement with a detent of an arcuate rack 52, said dog 51 being connected to and actuable by a rod 53. The rack 52 is secured to a bracket 54 carried by the complemental end of the rear axle casing 1. Arranged beneath the casing 1 and complemental to the bracket 54 is a plate 55, said plate being fixedly secured to the bracket 54 by means of bolts 56. By actuation of the rod 53 so as to release the dog 51 from engagement with the rack 52, and shifting the lever 6, the end of the rod 21 adjacent the yoke-shaped member 22 is raised or lowered and with such movement the arms 12 are tilted, thereby resulting in the tilting of the scraper blade 4 at an angle with respect to the surface of the ground.

To the rear end of the link 14, at pivot 15, Figures 2, 3 and 5, adjacent the U-shaped bearing 23 is connected the link 16, the link 16 in turn being connected to a lateral arm 17 carried by the base of the lever 5. The lever 5 is provided with a boss 19 which carries a dog 19' in engagement with a detent of an arcuate rack 18, said dog 19' being connected to and actuable by a rod 20. The rack 18 is secured to a bracket 29 carried by the complemental end of the rear axle casing 1. Arranged beneath the casing 1 and complemental to the bracket 29 is a plate 31, said plate being fixedly secured to the bracket 29 by means of bolts 30. By actuation of the rod 20 so as to release the dog 19' from engagement with the rack 18, and shifting the lever 5, the forward end of the associated arm 12 is raised or lowered resulting in the bottom edge of the scraper blade 4 being pitched forwardly, thereby resulting in the blade cutting into the earth at a greater depth or rearwardly to decrease the rake of the blade. In other words, by this mechanism the scraper blade 4 may be caused to make either a shallow or deep cut into the earth.

As clearly shown in Figures 1 and 2, the beam 7 carries a staple 32 which is pivotally pinned thereto, said staple being pivotally connected to the lower end of a rod 33. The upper end of the rod 33 is in threaded engagement with a bearing 34 to which are connected an end of each of a pair of divergent lever arms 35. The rod 33 is adjustably secured to the bearing 34 through the medium of a threaded nut 36. Each of the beams 35 extends downward at an incline toward the axle casing 1, and the other end of one of said beams is received between a pair of lugs 57 carried by the bracket 54, and is pivotally attached thereto by a pin 58. The other end of the other of the pair of lever arms 35 is received between a pair of lugs 59 carried by the bracket 29 and is pivotally attached thereto by a pin 37. Each of the lever arms 35 is provided with an ear 38 to each of which is attached a rod or link 39, said rods or links 39 being connected to an operating means actuable by the power unit of the tractor, not shown. Actuation of the rods or links 39 causes the raising and lowering of the blade 4 with respect to the surface of the earth.

To the end of the beam 7 projecting from the bottom of the bearing 8 is pinned a steering blade 40. The steering blade 40 is connected by a link bar 42 to a bracket 41 carried by the beam 7 by means of a pin 44. As clearly shown in Figure 2, the link bar 42 is provided with a plurality of openings 43 spaced therealong, any one of which is for the reception of the pin 44 therethrough, thereby permitting the link bar 42 to be adjustably connected to the bracket 41. By withdrawing the pin 44 and shifting the link bar 42 upwardly or downwardly, as desired, so that one of the openings 43 is moved into relation complemental to the opening in the bracket 41 and reinserting the pin 44, it is possible to raise or lower the steering blade 40 to a slight degree. The blade 40 exerts a steering effect when the scraper 4 is in a diagonal position, due to its tendency to counteract the side pull which the scraper in such position then exerts.

On its rear face the scraper blade 4, Figure 4, is reinforced by vertical iron brace bars 45 of any desired cross-sectional area which are connected by transverse brace rods 46 at their lower ends to the bearing 8.

From the foregoing description it is believed that the operation of the earth scraper will be clearly apparent. Further, it is obvious that it is relatively simple in construction and is adapted for ready connection to the rear end of any conventional farm tractor.

I claim:

1. The combination with a power-operated tractor having a rear axle housing; of grading apparatus comprising a beam having a downwardly-extending rear-end portion providing an arbor for a scraper blade bearing, a pair of forwardly-divergent arms rigidly secured at their rear end portions to said beam, a transverse rod disposed below the tractor rear axle housing, means securing said rod to the tractor rear axle housing for vertical movement of one end of said rod relative to the housing, respective links connecting the forward ends of said divergent arms to the corresponding ends of said rod to provide a towing connection between said beam and said tractor, a cylindrical bearing journaled on said beam arbor, a scraper blade secured to said bearing substantially at the mid-length portion of the rearward side of said beam, a partly-circular rack secured at its ends to the opposite ends of said blade, means operatively securing said rack to said beam ahead of said blade to hold said blade in adjusted, angular position relative to said beam, a pair of manually-operated levers mounted on the tractor rear axle housing, means operatively connecting one of said levers with the movable end of said rod for raising and lowering the corresponding end of said blade, means operatively connecting the other of said levers to the forward end of the corresponding diverging arm to incline said blade forwardly and rearwardly to vary the operating depth thereof, lever means pivotally connected to the tractor rear axle housing and extending rearwardly therefrom above said beam, means adjustably connecting the rearward end of said lever means to the rearward end portion of said beam, and power-operated means carried by the tractor and operatively connected with said lever means to raise and lower said scraper blades.

2. The combination with a power-operated tractor having a rear axle housing; of grading apparatus comprising a beam having a downwardly-extending rear-end portion providing an arbor for a scraper blade bearing, a pair of forwardly-divergent arms rigidly secured at their rear end portions to said beam, a transverse rod disposed below the tractor rear axle housing, means securing said rod to the tractor rear axle housing for vertical movement of one end of said rod relative to the housing, respective links connecting the forward ends of said divergent arms to the corresponding ends of said rod to provide a towing connection between said beam and said tractor, a cylindrical bearing journaled on said beam arbor, a scraper blade secured to said bearing substantially at the mid-length portion of the rearward side of the blade, a partly-circular rack secured at its ends to the opposite ends of said blade, means operatively securing said rack to said beam ahead of said blade to hold said blade in adjusted, angular position relative to said beam, a pair of manually-operated levers mounted on the tractor rear axle housing, means operatively connecting one of said levers with the movable end of said rod for raising and lowering the corresponding end of said blade, means operatively connecting the other of said levers to the forward end of the corresponding diverging arm to incline said blade forwardly and rearwardly to vary the operating depth thereof, lever means pivotally connected to the tractor rear axle housing and extending rearwardly therefrom above said beam, means adjustably connecting the rearward end of said lever means to the rearward end portion of said beam, power-operated means carried by the tractor and operatively connected with said lever means to raise and lower said scraper blade, a steering blade pivotally connected at its forward end to the lower end of said arbor and extending rearwardly therefrom substantially in alignment with said beam, and adjustable means extending between the rear end of said blade and said beam at the top of said arbor to hold said steering blade at various selected positions of inclination relative to said arbor.

HAROLD R. WATSON.

REFERENCES CITED

The following references are of record in the file of this patent:

UNITED STATES PATENTS

| Number | Name | Date |
|---|---|---|
| 1,249,264 | Wendell | Dec. 4, 1917 |
| 2,063,537 | Beard | Dec. 8, 1936 |
| 2,309,750 | Carrington | Feb. 2, 1943 |